United States Patent [19]
Romi

[11] Patent Number: 5,222,846
[45] Date of Patent: Jun. 29, 1993

[54] ULTRA-PRECISION SUB-MICRON BORING TOOL AND PRE-SETTING SYSTEM

[75] Inventor: Giordano Romi, Sao Paulo, Brazil

[73] Assignee: Industrias Romi S.A., Brazil

[21] Appl. No.: 738,918

[22] Filed: Aug. 1, 1991

[30] Foreign Application Priority Data

Dec. 3, 1990 [BR] Brazil .................. PI 9006125[U]

[51] Int. Cl.⁵ .............................................. B23B 29/06
[52] U.S. Cl. ...................................... 408/161; 82/1.2; 408/168
[58] Field of Search ........ 408/147, 158, 161, 168–170, 408/171; 407/37, 45; 82/1.2–1.5

[56] References Cited

U.S. PATENT DOCUMENTS

| | | | |
|---|---|---|---|
| 3,730,636 | 5/1973 | Mizoguchi | 408/169 |
| 4,648,757 | 3/1987 | Plummer | 408/161 X |
| 4,793,748 | 12/1988 | Santi | 408/161 |

Primary Examiner—Steven C. Bishop
Attorney, Agent, or Firm—Steinberg & Raskin

[57] ABSTRACT

An ultra-precision sub-micron boring tool and pre-setting system for finishing through bores or blind bores is disclosed. The system includes a cylindrical cartridge having an internal hollow portion, a first through bore located in the hollow portion, and a toothed segment lodged in the first through bore. The toothed segment and a micrometric screw, which passes through an axial bore in the toothed segment, are arranged on a common geometric axis. A bushing having an internal thread is located in the interior of the axial bore so that the micrometric screw engages with the internal thread. The system also includes a hollow stud which lodges and retains the bushing, a set of rings which carry and envelope the micrometric screw so that the micrometric screw is supported by the set of rings in relation to the cylindrical cartridge, a locknut, a graduated dial attached to an end of the micrometric screw through the locknut, and a second through bore located in the cylindrical cartridge. The second through bore is arranged substantially in a right angle plane which may be inclined in relation to the first through bore. A tool tip is located on a tool shank lodged in the second through bore. Further, the system has a backlash suppression system located in the second through bore and between the tool shank and the toothed segment in the first through bore.

38 Claims, 10 Drawing Sheets

ULTRA-PRECISION SUB-MICRON BORING TOOL AND PRE-SETTING SYSTEM

BACKGROUND OF THE INVENTION

The invention refers to a ultra-precision sub-micron boring tool and pre-setting system or device and more specifically to a sub-micron boring tool and pre-setting system or device that when rotating at very high speed and within ultra precision performs the finish machining operation of boring of ultra precision blind and through bores on parts that are preferably stationary, but not limited to, as to their rotating movement.

In accordance with the present state-of-the-art, to meet ultra-precision requirements, the positive or negative deviations permitted in relation to a pre-established theoretical nominal dimension either for components or for micrometric pre-setting can not exceed 1 micron (1 millionth of a meter, $\mu$m).

Several types of devices for tool pre-setting are known and widely used, however, in general all of them are built with their operating knob and mechanisms actuating directly on the tool shank, which does not provide enough accuracy sensibility to fine setting and also are not satisfactory as to consistent pre-setting repeatability and are not provided with means to eliminate backlash.

These deficiencies found on conventional pre-setting devices do not allow a very precise and fine micrometric setting (within the micron magnitude) of the cutting tool in relation to the workpiece, making it difficult and slow the finish machining operation of high precision bores.

To overcome the aforementioned difficulties and inconveniences, the present invention deals with a pre-setting tool system that on the contrary of embodying operating knob and mechanism actuating directly on the tool shank such as it happens in known present state-of-the-art tool pre-setting devices, the operating knob of the novel pre-setting system actuates indirectly the tool shank in a sequence of subsequent steps or phases, as it will be explained in the subsequent description.

Furthermore, due to the ultra high accuracy that the tool edge can be pre-set by acting on the ultra-precision sub-micron boring tool operating knob it excludes the need of any additional pre-setting as it is a must when using state-of-the art boring tool devices.

The tool pre-setting herewith considered refers to the pre-setting of a tool edge position of a rotatable tool, which revolves around an axis of rotation being the pre-set dimension the distance that goes from the most distant or farthest point on tool edge to its geometric axis around which the tool revolves.

SUMMARY OF THE INVENTION

One basic objective of the present invention is to provide a sub-micron boring and tool pre-setting system which construction enables the elimination of backlash of the whole assembly, also embodying a motion reducing mechanism or motion demultipler mechanism which imparts displacement to the tool shank in an indirect manner, which enables and assures superfine micrometric pre-setting of the tool shank and guarantees precise, repeatable and wholly consistent pre-setting of cutting tool edge corresponding to increments of a micron on diameter for finish machining ultra precision bores, and which additionally enables that the degree of fineness or precision of reading, that is, that the magnitude of sub-micron increments be obtainable through choice at the time of the demultiplying ratio is established at the design stage, because the referred magnitude of increment decreases at an inverse proportion as the demultiplying ratio increases.

Another equally important objective of the present invention is to provide a sub-micron system for boring tool and tool pre-setting that offers an extremely simple means to set-up tool displacement to determine the bore diameter to be machined, enabling that such setting be made in reduced time without trial and error and that backlash elimination is accomplished in such a way that always and wherever displacing movement of moving parts occurs in the mechanism inside the sub-micron system through the whole kinematics, i.e., starting up from the turning of a control knob down to the tool edge, all contact surfaces of all parts involved that co-operate together, that is, work coupled so that through the displacement of referred contact surfaces they slide, ones in relation to the others, under a metal to metal contact condition to set (to accomplish and establish) the tool edge position determining and establishing a distance that corresponds to the farthest point from the tool edge in relation to its geometric axis of rotation in such a way that due to metal to metal contact between the sliding surfaces of all sliding parts involved, it is positively assured that said displacement of parts are always exempt from lost motion, backlash and/or deviations of any nature or magnitude, which is a basic, indispensable and unquestionable condition to accomplish the ultra-precision pre-setting and to assure consistent ultra-fidelity of pre-setting repeatability within ultra-precision standards.

These and other objectives and advantages of the present invention, are achieved with a sub-micron tool boring and pre-setting system provided with a motion reducing mechanism or motion demultiplier mechanism, which imparts displacement to tool shank for finishing either blind or through bores, consisting basically of a cylindrical cartridge to operate at high speed, being actuated by a machine tool spindle to perform finish machining operations of precision bores with a single point tool, maintaining the workpiece stationary as to its rotating movement, being that the work feed can be achieved either by axial movement of the machine tool spindle maintaining the workpiece stationary as to feed movement or by axial feed on the workpiece, said axial feed being parallel to the geometrical axis of the cylindrical cartridge, being this last one stationary as to the feed motion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 3:
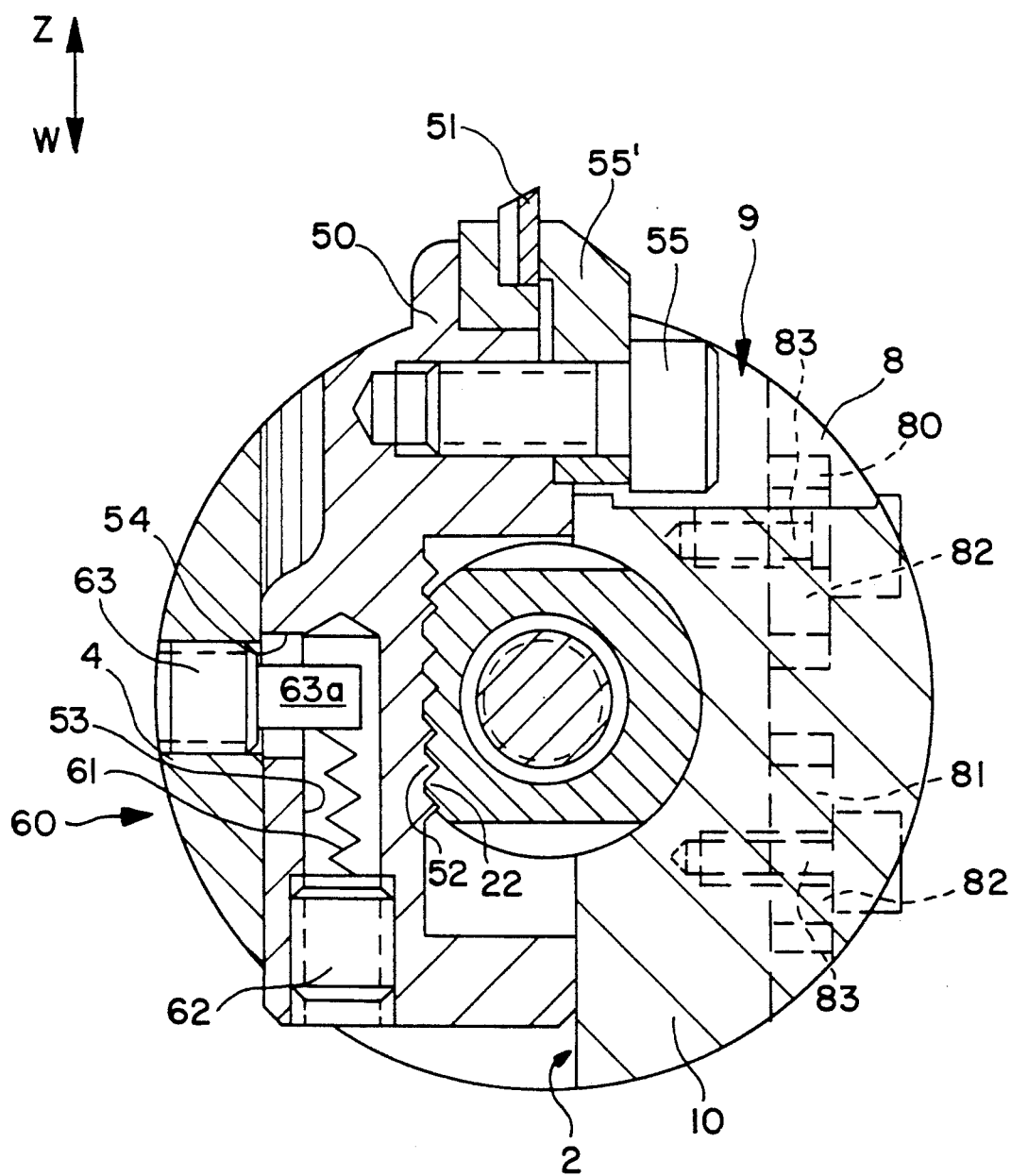
FIG. 3 is a cross section of the sub-micron system taken from line B—B of FIG. 2.
Figure 4:
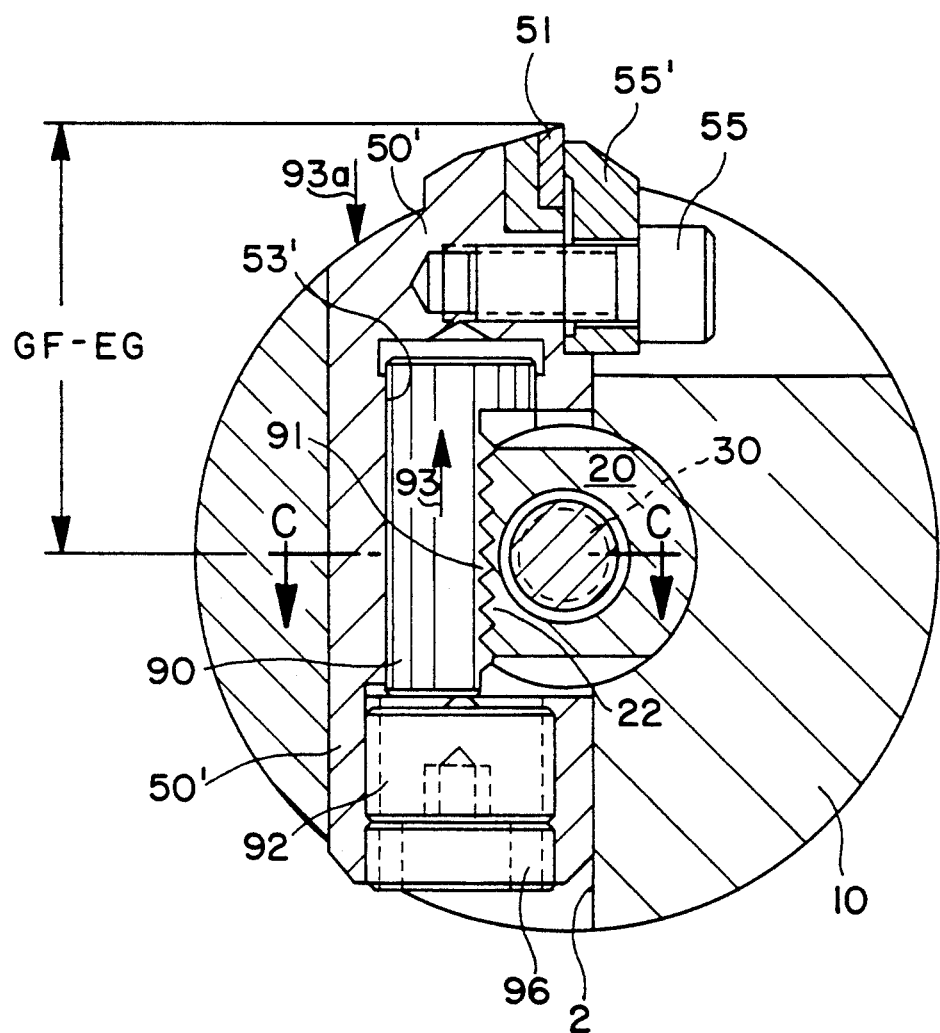
FIG. 4 is a cross section taken from line B—B of FIG. 2, however illustrating an alternative construction format for the tool shank.
Figure 4A:
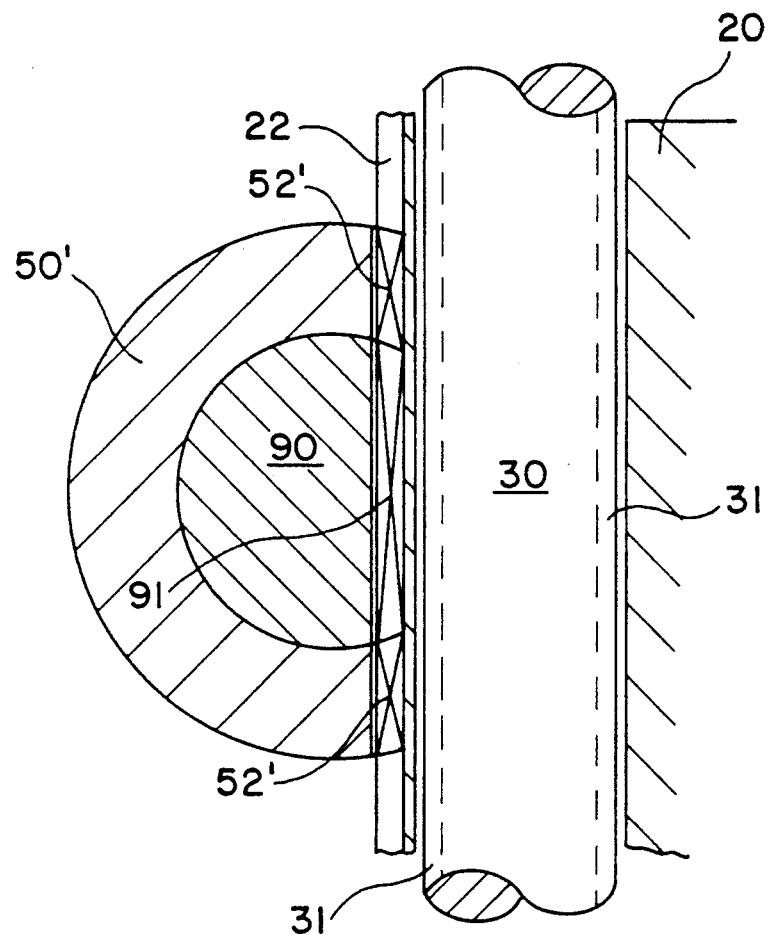
FIG. 4a is a cross section taken from line C—C of FIG. 4.
Figure 4B:
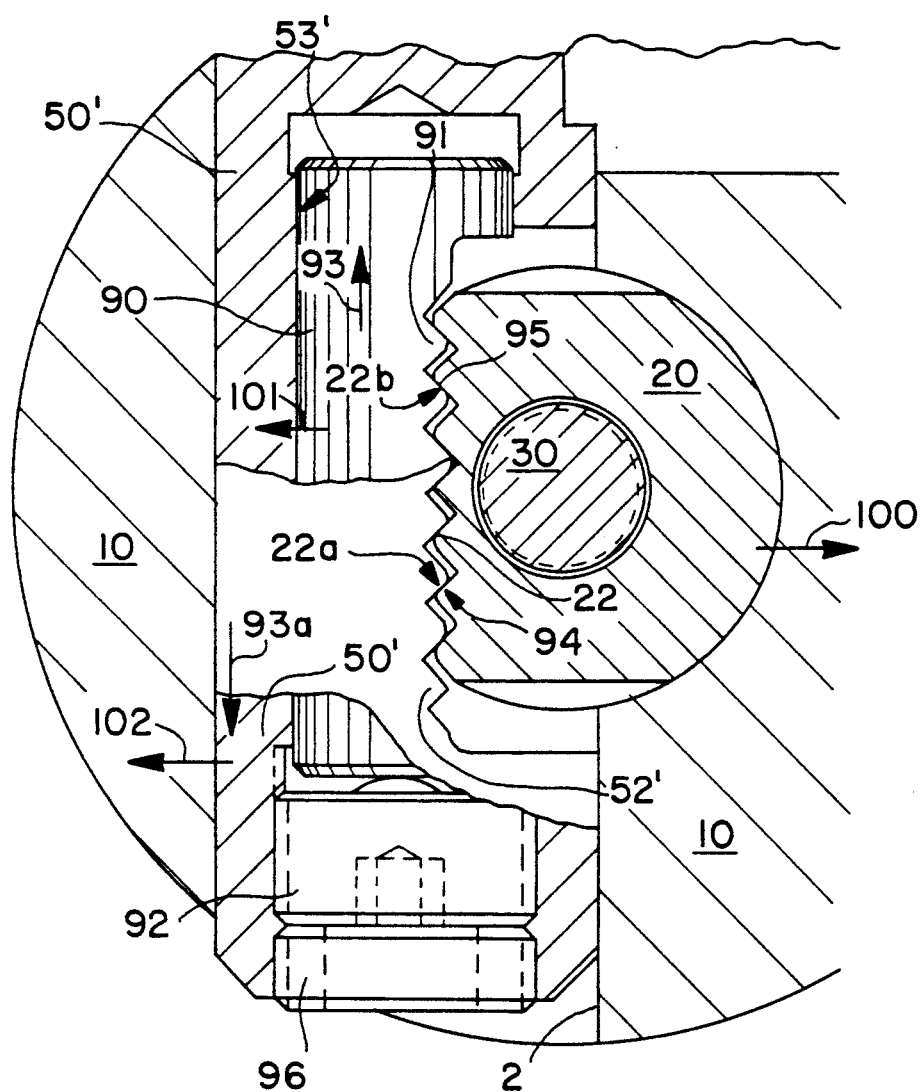
FIG. 4b is an enlarged detail of FIG. 4.
Figure 4C:
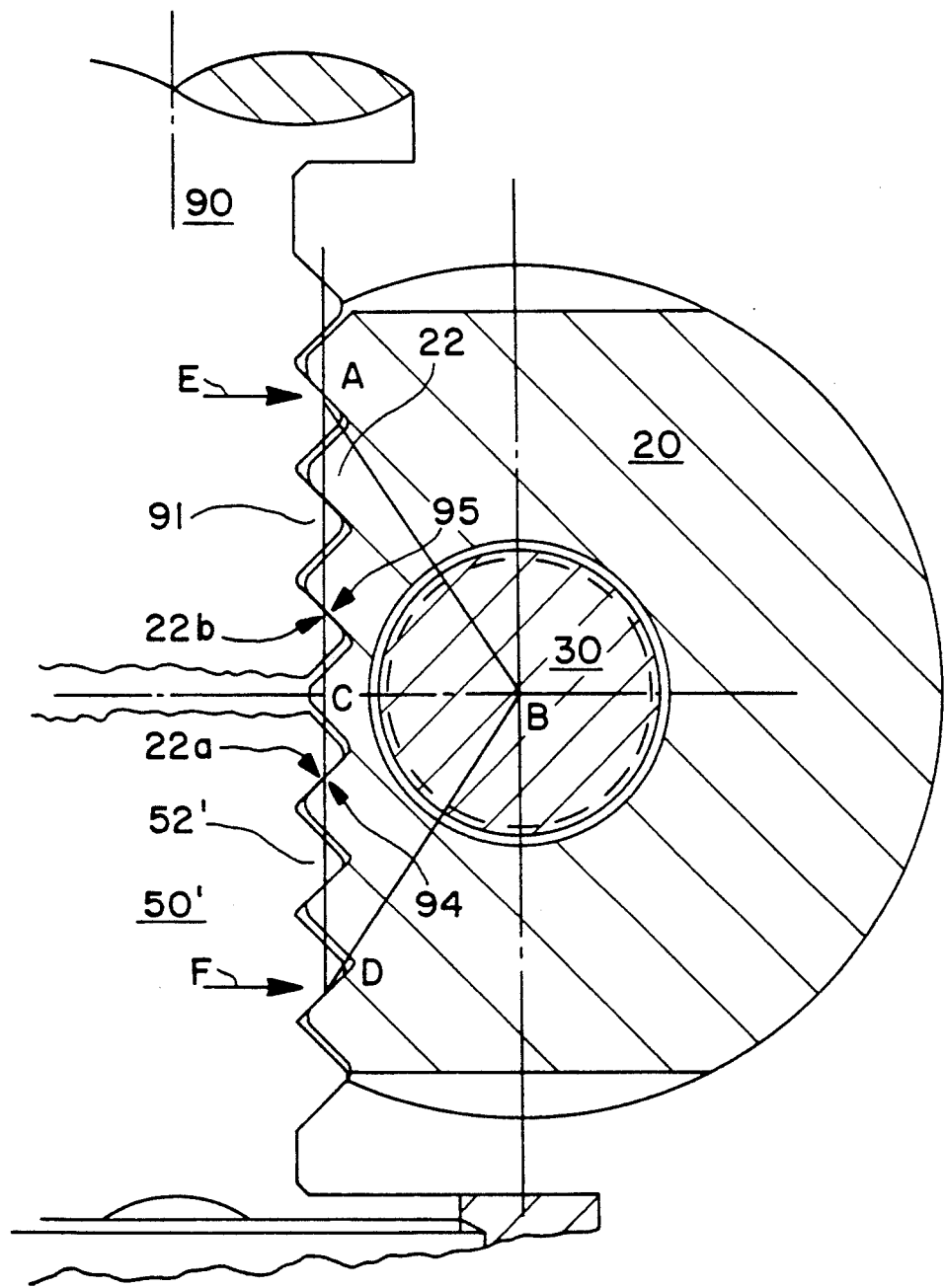
FIG. 4c is an enlarged detail of cross section illustrated in FIG. 4b, being illustrated the reaction of efforts between the parts during backlash adjustments of the sub-micron system.
Figure 5:
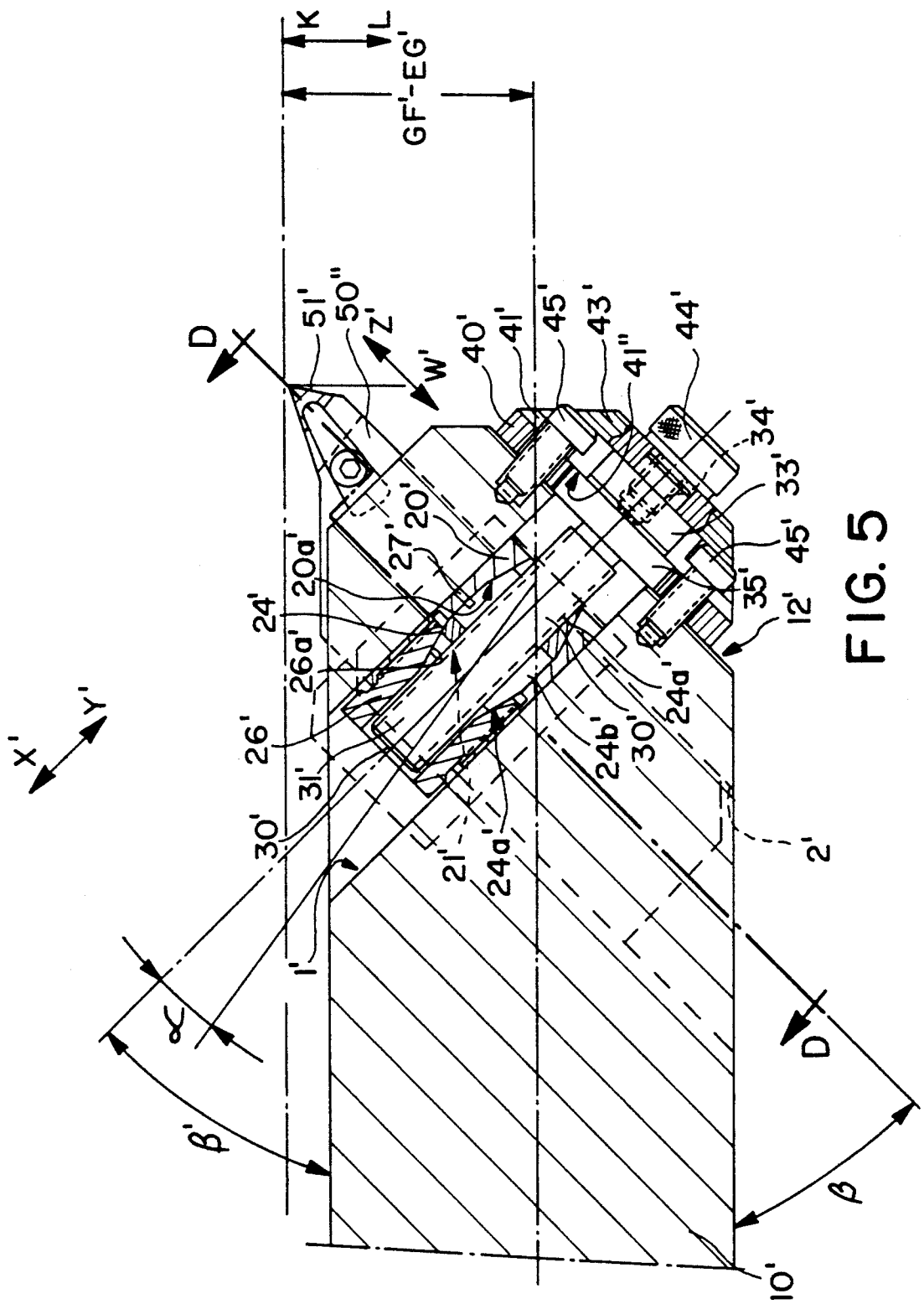
FIG. 5 is a longitudinal section of the sub-micron boring tool and pre-setting system in an alternative solution destined preferably for finishing blind bores.
Figure 6:
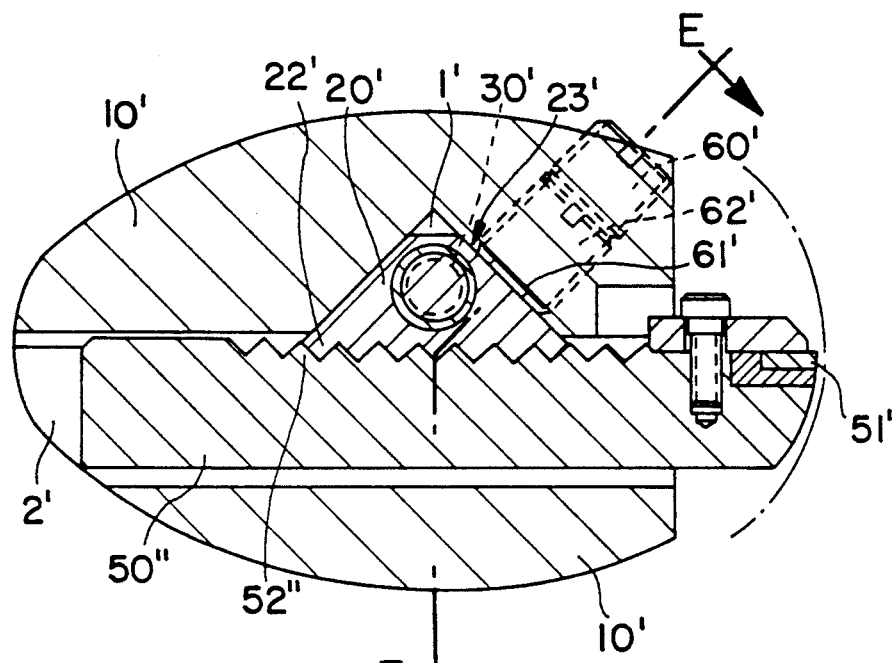
FIG. 6 is a cross section taken from line D—D of FIG. 5.
Figure 7:
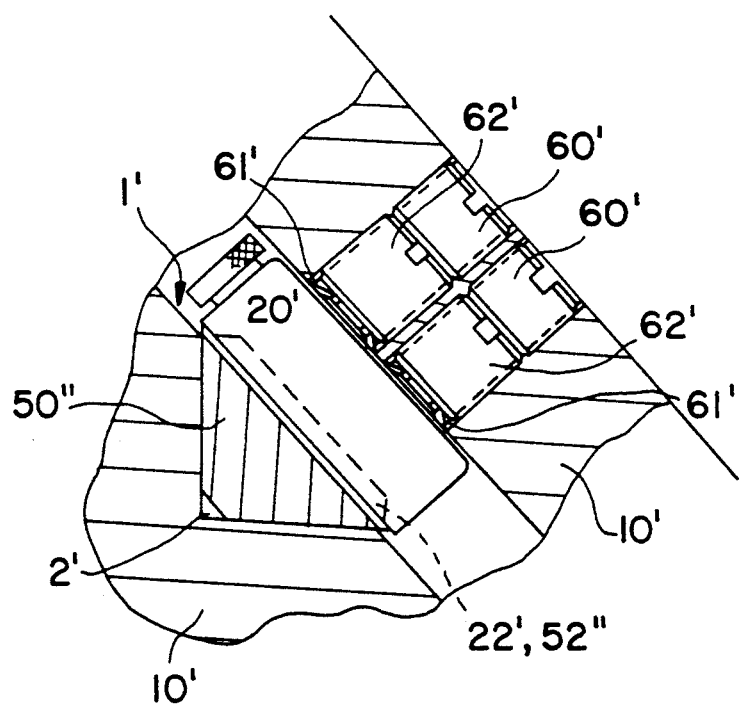
FIG. 7 is a cross section taken from line E—E of FIG. 6.

In accordance with these Figures, the sub-micron boring tool and pre-setting system subject of the present invention is provided with a motion reducing mechanism or motion demultiplier mechanism consisting of two toothed segments which teeth have converging flanks, and a micrometric screw which is also useful for tool pre-setting, destined preferably for finish machining of through bores as illustrated in FIGS. 1, 2, 3, 4, 4a, 4b and 4c and for the alternative solution destined preferably for finish machining of blind bores as illustrated in FIGS. 5, 6 and 7.

Figure 9:
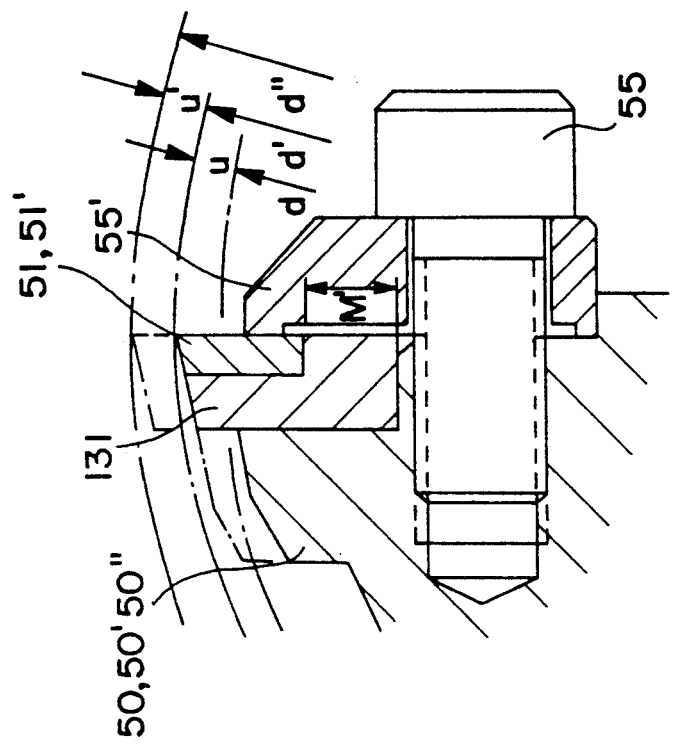
FIG. 9 is another detail of cutting tool clamping.
Figure 8:
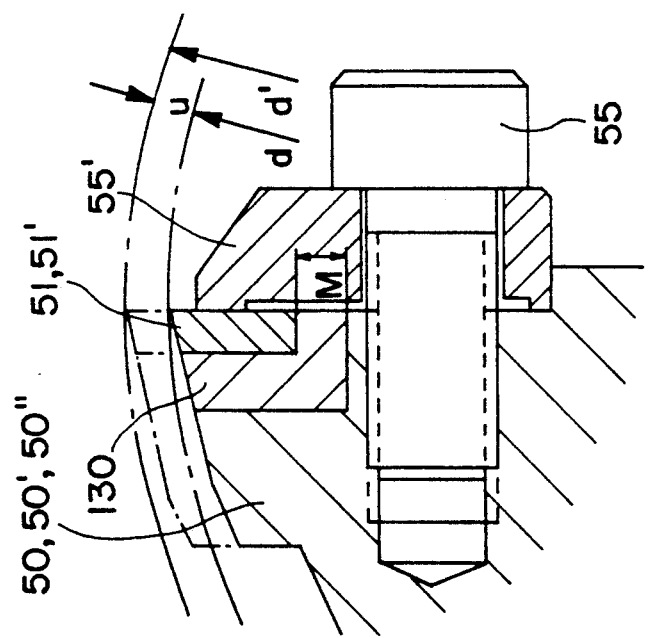
FIG. 8 is a detail of cutting tool clamping.

Another objective of the present invention is obtained with the constructive arrangement for cutting tool clamping, illustrated in FIGS. 8 and 9 and described further on in which the field of work between the smallest and largest machining diameters can be further increased enabling the use of the same device for several bore diameters.

The sub-micron boring tool and pre-setting system for finishing preferably through bores, illustrated in FIGS. 1, 2, 3, 4, 4a, 4b and 4c consists of a main body in the format of cylindrical cartridge 10, internally hollow by bore 1 stepped along the length of its body where toothed segment 20 is lodged; micrometric screw 30, both arranged on a common geometric axis, being said micrometric screw 30 provided with threaded external section 31 in one of its ends which is free to pass through an axial bore in toothed segment 20 and coupled with internal thread 21 provided in bushing 24, being said bushing 24 lodged and internally retained by extension 25 through hollow stud 26, being said extension 25 fixed at one end of toothed segment 20 by thread 20a; ring 40 that supports micrometric screw 30; spacer ring 41, ring 42 that also supports micrometric screw 30; rotation control knob 43 that is supported by micrometric screw 30 close to the other end of this micrometric screw; locknut 44 provided with fastening stud 44a and pad 44b, threaded on thread 32 provided externally on the other end of micrometric screw 30, and locating ring 13 lodged at the end of cylindrical cartridge 10 and covered by protection 14.

Seeing FIG. 3 it is noticed that cylindrical cartridge 10 incorporates another bore 2 located preferably, but not limited to, at a right angle, being said bore 2 possible to be inclined or oblique in relation to the geometric axis of said cylindrical cartridge 10, being in said bore 2 lodged tool shank 50 provided with tool 51 tightened by screw 55 acting on clamp 55'.

Figure 2:
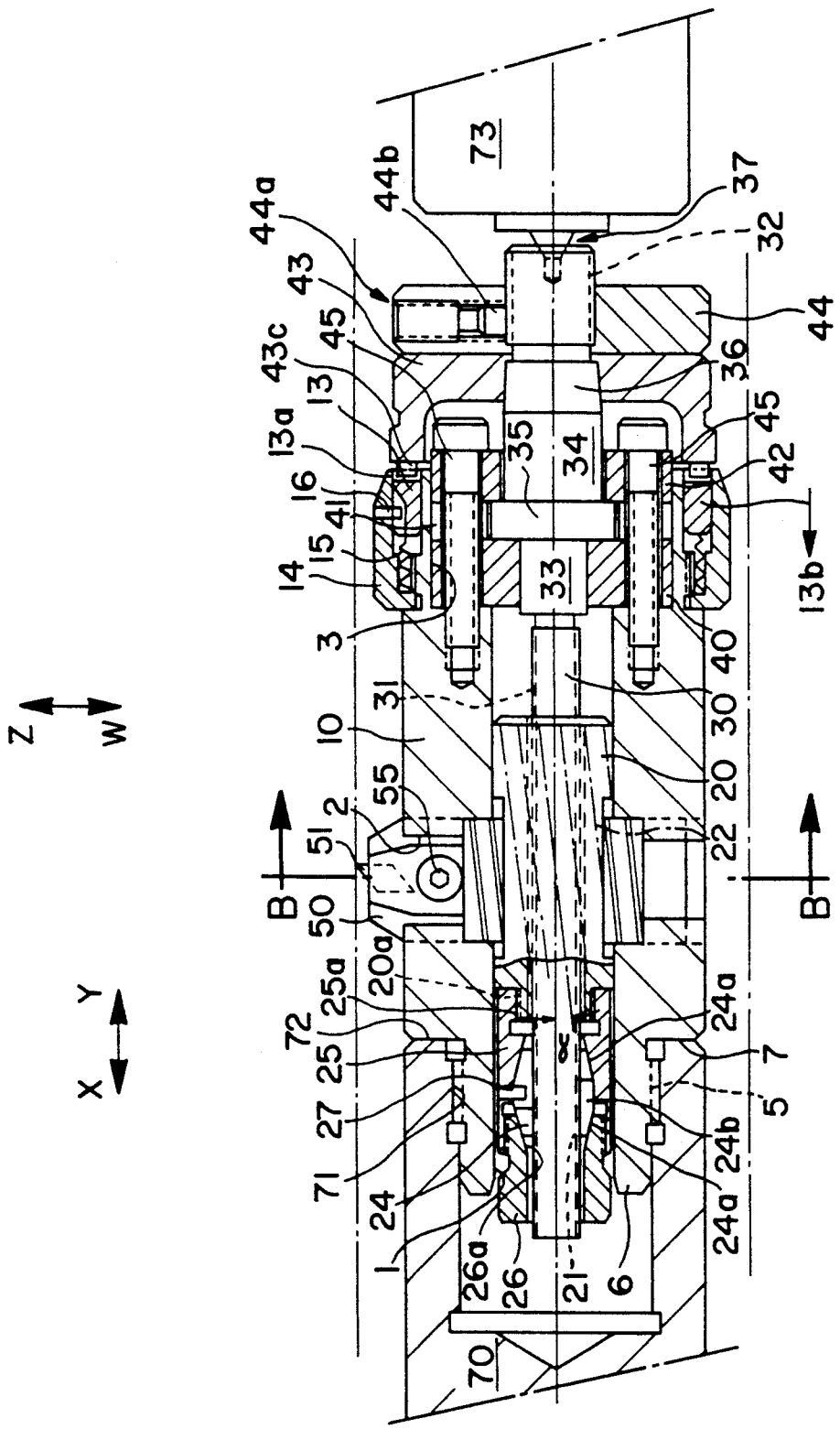
FIG. 2 is a longitudinal view of the sub-micron system, taken from line A—A of FIG. 1.

According to FIG. 2, bushing 24 is provided with male tapered section 24a in its ends, which adjust to corresponding female tapered sections 25a and 26a provided internally respectively in extension 25 and hollow stud 26 and is still provided with slotted sections 24b longitudinally slotted in its body on both sides and inserted between themselves in such a way that the slots starting from one end do not go through the other end.

Backlash elimination between the thread of micrometric screw 30 and internal thread 21 provided in bushing 24, is accomplished by tightening hollow stud 26 which when turned in the internal thread provided in extension 25, it presses bushing 24 between female tapered sections 25a and 26a which when actuating male tapered section 24a and in cooperation with slotted sections 24b impose a contraction, causing an elastic decrease in the outside diameter of bushing 24, and consequently decreasing also the diameter of internal thread 21 which involves the thread of micrometric screw 30 until it eliminates entirely the backlash between said threads, however, allowing that the micrometric screw may be smoothly rotated.

Pin 27 radially fixed in extension 25 with its free end fitted in one of the slotted sections 24b provided in bushing 24, avoids that said bushing 24 may rotate in relation to said extension 25.

In the larger diameter represented by longitudinal bore 3 of cylindrical cartridge 10, are lodged without clearance ring 40, spacer ring 41 and ring 42 which constitute the bearing system on which micrometric screw 30 rotates and is supported radially and axially, being said rings 40, 41 and 42 fixed by screws 45 which go through these last ones and are threaded in the back wall which defines the length of bore 3.

In this way ring 40 and ring 42 act as radial bearing to micrometric screw 30 in its medium portion, being the support bearing in radial direction acting as bearing without clearance of portion 33 of micrometric screw 30 in corresponding bore of ring 40, being the thrust bearing in the axial direction consisting of adjoining faces of rings 40 and 42 which spaced by spacer ring 41, retaining collar 35 of micrometric screw 30 between sections 33 and 34 suppressing, therefore, any axial play of said micrometric screw 30.

Micrometric screw 30 incorporates at its outer end to the cylindrical cartridge 10, a tapered seat 36 with converging diameter (reduction) towards the outer end of said micrometric screw 30, being that to said tapered seat 36, the knob 43 is solidarily coupled permitting its radial and axial positioning, said positioning being assured through tightening of locknut 44, which in turn is securely fastened or locked by thread 32 of micrometric screw 30 through stud 44a and pad 44b, being this last one made of brass or any other material of less hardness appropriate for assuring proper locking without damaging fillets of thread 32.

Figure 1:
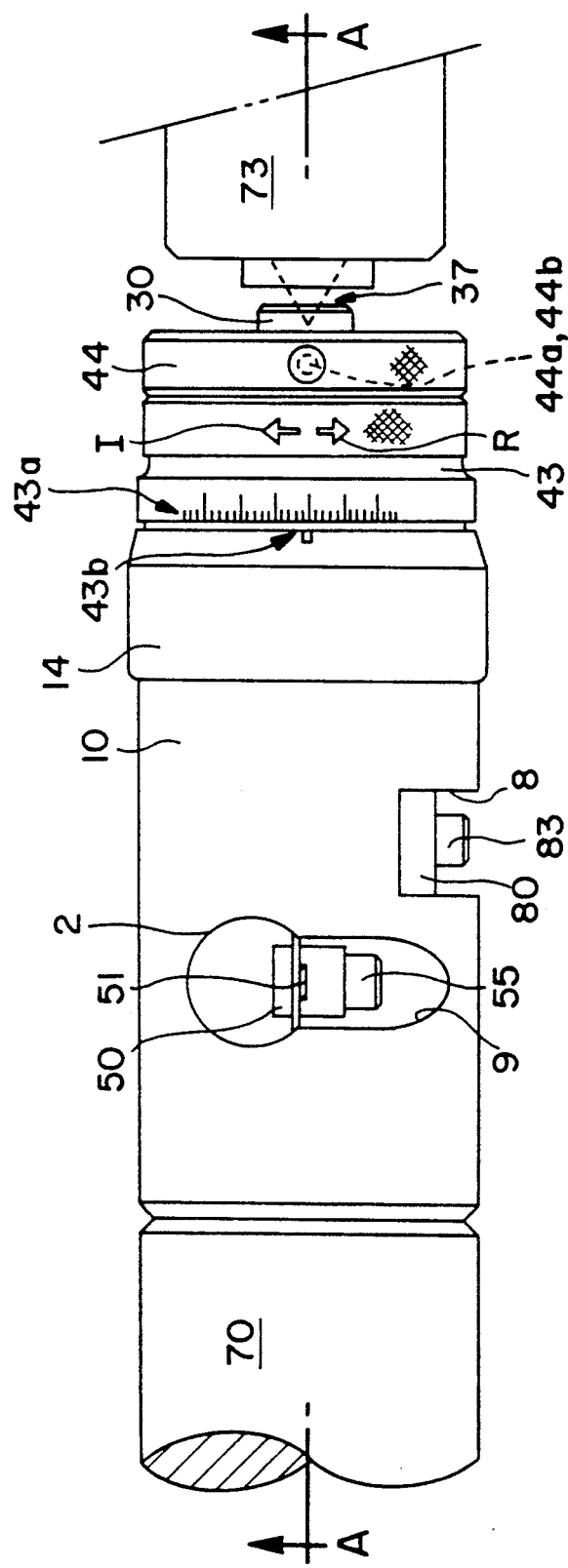
FIG. 1 is a longitudinal view of the sub-micron boring tool and pre-setting system in a first form destined preferably for finishing through bores.

As shown in FIG. 1, externally and at the periphery of rotation control knob 43, at the rim adjacent to cylindrical cartridge 10, it is engraved scale 43a graduated with engraved equidistant lines to be used as a means for reading the displacement of tool 51 when knob 43 is manually turned, having as reference index or point 43b engraved at protection cover 14 adjacent to referred graduated scale 43a.

With this type of tapered coupling between micrometric screw 30 and knob 43, that is, the coupling of knob 43 in the tapered seat 36, it is possible to provide in a selective way the zeroing or reset of graduated scale 43a in relation to index 43b to establish a certain edge position of tool 51 in relation to the geometric center of cylindrical cartridge 10 in order that the zero in graduated scale 43a coincides with index 43b. After zeroing or resetting, rotation control knob 43 is set in tapered seat 36 through lock nut 44, once said knob 43 is solidarily joined to micrometric screw 30.

Returning to FIG. 2, it is seen that turning by hand rotation control knob 43 and consequently micrometric screw 30, threaded section 31 of this last one, which engages in internal thread 21 of bushing 24, causes axial sliding of toothed segment 20 along bore 1 of cylindrical cartridge 10, which sliding can be selectively made in both directions indicated by arrows X and Y, depending on the direction of rotation of knob 43.

It is seen in FIGS. 2 and 3 that with the axial sliding of toothed segment 20, in relation to cylindrical cartridge 10, radial displacement movement is imparted to tool shank 50 through a motion demultiplier mechanism, defined by indentation 22 in an approximate rack fashion, provided externally in toothed segment 20 in a plane secant to its cylindrical body being said indentation 22 longitudinally indented and with slight inclination $\alpha$ in relation to its geometric axis, which teeth 22 mesh in a sliding manner totally free from any backlash to corresponding teeth 52, provided in a secant plane of the cylindrical body of tool shank 50.

Based on FIGS. 1 and 2, in order to cause an increment in the depth of cut, that is, a radial displacement of tool shank 50, rotating control knob 43 is turned by hand in the direction of arrow I so that threaded section 31 causes axial displacement in toothed segment 20, in the direction of arrow X and indentation 22, being slightly inclined and in close contact with teeth 52 of tool shank 50 it causes radial displacement of said tool shank 50 in relation to cylindrical cartridge 10 in the direction of arrow Z. In the same manner, the withdrawal of tool shank 50, that is, its displacement in the direction of arrow W is made by turning rotating control knob 43 in the direction of arrow R.

As shown in FIG. 3, to assure accurate displacement and to guarantee a stable position of tool shank 50 in relation to cylindrical cartridge 10, it is provided resilient backlash eliminator system 60 provided with spring 61 lodged in hole 53 provided in tool shank 50 body, so that one end of said spring 61 actuates at the inner end of stud 62 threaded in the entrance of hole 53 and the other end of said spring actuates on end 63a of stud 63 threaded in hole 4 provided in cylindrical cartridge 10 body, being that end 63a of stud 63 enters hole 53 through opening 54 provided in tool shank 50 body. In this way, spring 61 acts on stud 62 and reacts at end 63a of stud 63, keeping tool shank 50 always forced in the direction of arrow W.

Therefore, the described sub-micron system can be coupled either directly to the machine main spindle and/or coupled to a shank extension in the case of machining deep holes, being this shank extension coupled to the machine spindle.

As illustrated in FIGS. 1 and 2 when the device is coupled to shank extension 70, the coupling end of cylindrical cartridge 10 is provided with a recessed section with threaded portion 5 and centering portion 6.

Therefore, cylindrical cartridge 10 is fixed in shank extension 70 by screwing threaded portion 5 to corresponding internal threaded portion 71 of said shank extension 70, being the screwing tightness obtained by resting extreme face 72 of shank extension 70 on face 7 defined in this end of cylindrical cartridge 10.

Centering and perfect alignment of cylindrical cartridge 10 with shank extension 70, are assured by precision fitting of centering portion 6 perfectly concentric with geometric axis of cylindrical cartridge 10, in a corresponding bore provided in the interior of shank extension 70 also perfectly concentric with geometric axis of said shank extension 70, and by resting extreme face 72 of this last one on extreme face 7 at a square (right) angle of longitudinal axis of cylindrical cartridge 10.

When machining deep bores and when the sub-micron system remains stationary as to feed movement, seat 37 provided concentric in the free end of micrometric screw 30, makes possible to the device to rest on the machine tailstock 73, totally eliminating overhang and further ensuring rigidity to the device which is an important condition for precision machining.

Tailstock 73 even when equipped with live center may cause slight resistance due to friction at the cone of seat 37 with tendency of rotating micrometric screw 30 in relation to cylindrical cartridge 10, tending to accidentally change pre-set radial distance GF—EG, GF'—EG' during machining. To avoid accidental alteration of pre-set distance GF—EG, GF'—EG' control knob 43 is provided with ratchet indent 43c in its face adjoining extreme face of cylindrical cartridge 10, which teeth are coupled to ratchet indent 13a provided at face of loaded spring locating ring 13, being this last one lodged in a sliding manner at the end of cylindrical cartridge 10, pressed against ratchet indent 43c through loaded springs 15, and radially retained by pin 16 which avoids turning of said ring 13 in relation to cylindrical cartridge 10.

When control knob 43 is manually turned, the turning action of ratched indent 43c which teeth profile are notched with converging flanks to the direction of the teeth top, actuating in ratched indent 13a, which teeth profile are also notched with flanks converging to the direction of the teeth top, ring 13 is displaced towards arrow 13b (FIG. 2) disconnecting said ratched indent 43c and 13a. Having said ratched indents 43c and 13a a number of teeth, which may either be double or any multiple of the number of divisions of graduated scale 43a, assures that when the ratched indents are again coupled to subsequent ratched indents, the maximum radial displacement of rotation control knob 43 is half or any sub-multiple of the value read between two adjacent lines of graduated scale 43a.

Considering that the sub-micron system is useful for ultra precision machining where it is required an extremely low level of vibration during operation and that said sub-micron system operates at very high speeds, cylindrical cartridge 10 is provided with a balancing system to balance rotating masses as shown in FIG. 3, being said system comprised of, as an example and without limitation, two blocks 80 and 81 lodged in slot 8 provided at the middle of cylindrical cartridge 10 and positioned in a secant plane parallel in relation to the geometric axis of bore 2, being said blocks 80 and 81 provided with elongated openings 82, that can be trespassed by fastening screws 83 which allow the displacement, positioning and fastening of blocks 80 and 81 in slot 8 during balancing operation. Even though it is not shown in FIG. 4, said balancing system is also applicable in the constructive alternative shown in said drawing and described further on.

The body of cylindrical cartridge 10 also incorporates in the periphery in secant position but at a substantial square (right) angle to bore 2, rounded slot 9 which provides lodging space for screw 55 which clamps tool tip 51 onto tool shank 50 as shown in FIGS. 1 and 3.

FIGS. 4, 4a, 4b and 4c show a constructive alternative of the sub-micron system for finish machining of preferably through bores. As shown in FIG. 4b, backlash elimination (backlash suppression) between teeth 22, provided in toothed segment 20, and teeth 52' provided in tool shank 50', is accomplished in a positive way, that is, having said teeth 22 and 52' interact in a forced way, one against the other, through the adjustment of indented plunger 90 precision lodged and slidable in axial bore 53' provided internally in the body of tool shank 50', being said indented plunger 90 provided with teeth or indentation 91 in the same plane of teeth 52' of tool shank 50' and actuating teeth or indentation 22 of toothed segment 20.

Backlash elimination between teeth, schematically illustrated in FIG. 4b, is accomplished by adjusting stud 92, which is threaded in an internal thread provided in tool shank 50', being that the adjustment of stud 92 displaces indented plunger 90 in relation to tool shank 50' in the direction of arrow 93, causing flanks 94 of teeth 52' provided in tool shank 50' to rest against flanks 22a of teeth 22 provided in toothed segment 20, and flanks 95 of teeth 91 provided in indented plunger 90 to rest against flanks 22b of teeth 22 provided in toothed segment 20.

Once the adjustment is made through stud 92 so that the teeth flanks are put in contact under a metal to metal condition, totally free from any backlash but still allowing a smooth sliding of toothed segment 20 and tool shank 50', stud 92 is locked through tightening of lock stud 96.

Considering the set of parts 20, 90, 50' and 92, illustrated in FIGS. 4, 4a and 4b, and as already explained, by moving forward stud 92 by rotating it in the interior of shank 50', it also pushes forward indented plunger 90 forcing it to travel in the direction indicated by arrow 93 and while the body where said stud 92 rotates, the body of tool shank 50' is simultaneously forced or pushed to travel in the direction indicated by arrow 93a, that is, in opposite direction that indented plunger 90 travels.

In accordance with FIG. 4b the relative movement of the two parts 90 and 50' in opposite directions with the teeth of each of them, that is, teeth 52' of tool shank 50' and teeth 91 of indented plunger 90, acting on opposite flanks 22a and 22b of teeth 22 of toothed segment 20 and the special profile of teeth flanks being themselves not parallel but being convergent flanks, they may have a triangular prismatic shape or the shape of involute or a shape in which the flanks may be of unequal profiles, or still of any other shape as long as the teeth thickness decreases as the profile approaches the converging line at the teeth top, causes the withdrawal or retraction of toothed segment 20 in the direction indicated by arrow 100 and withdrawal or retraction of parts 90 and 50' in the direction of arrows 101 and 102 respectively, this retraction of parts 90 and 50' being in opposite direction of the direction of retraction of toothed segment 20.

Referring now to FIG. 4, being said parts 20 and 50' lodged in a slidable way in appropriate bores provided in cylindrical cartridge 10 and indented plunger 90 lodged also in slidable way in axial bore 53' of tool shank 50', the withdrawal movement will cease when all clearances have been suppressed, not only between the inclined teeth but also on one side between toothed segment 20 and cylindrical cartridge 10 and on the other side between indented plunger 90 and tool shank 50', against which indented plunger 90 is pushed by inclined teeth effect and finally, when all clearances have also been suppressed between shank 50' and cylindrical cartridge 10, against which tool shank 50' is pushed either by the inclined teeth or by the reaction effect of indented plunger 90 on tool shank 50'.

At the instant a displacement of toothed segment 20 and tool shank 50' is reached under a metal to metal sliding condition, with zero clearance and zero interference, a condition of absolute prevention of angular displacement of toothed segment 20 in relation to cylindrical cartridge 10 is established, because the bearing contact in opposite flanks 22a and 22b of teeth of toothed segment 20 in its external portion form with the center (axis) of micrometric screw 30, rectangular triangles A—B—C and D—B—C, illustrated in FIG. 4c, where in points A and D of hypotenuses A—B and D—B, said teeth of toothed segment 20 are in contact metal to metal at points E and F of corresponding teeth 91, 52' of indented plunger 90 and of tool shank 50', preventing angular movement of any nature or magnitude of toothed segment 20 even though at the lodging at bore 1 where toothed segment 20 slides in said bore 1 of cartridge 10, the periphery geometric shape, that is, the cross section configuration of toothed segment 20 as well as the mating geometric shape where said toothed segment 20 seats into bore 1 perpendicular to the sliding axis, correspond to a perfect circle and because toothed segment 20 has a flat plane cut secant and parallel to the axis of said toothed segment 20 and because said secant plane bears on a flat and parallel plane on tool shank 50' and indented plunger 90.

Looking at FIGS. 2, 3 and 4b, the sliding action totally free from backlash or play of tool shank 50, 50' and toothed segment 20 at bores 2 and 1, respectively, the sliding action also totally free from any backlash between the flanks of teeth 22, 52 or 22, 52' and 91, the rotation of micrometric screw 30 totally free from backlash at internal thread 21 and totally free from axial backlash, since the adjacent faces of rings 40 and 42 that are spaced by spacer ring 41 retain collar 35 of micrometric screw 30 between portions 33 and 34 prevent any magnitude of axial play of said micrometric screw 30 and finally the system consisting of all components involved and engaged to assure that the pre-set radial distance GF—EG, as seen in FIG. 4, is precisely maintained within the micron and assuring to all moving parts that their displacement is free from backlash thus assuring also stability to the position of the edge of tool 51 in a way to guarantee within a thousandth of a millimeter or a millionth of a meter ($\mu$m) the GF—EG radial distance that goes from the tool edge farthest point to the geometric axis of cylindrical cartridge 10, around which in 360° revolution precision repeatability is positively assured in constant way until tool wear occurs.

The sub-micron boring tool and pre-setting system for machining, in the alternative form of the invention for finishing preferably blind bores as illustrated in FIGS. 5, 6 and 7 is comprised basically of cylindrical cartridge 10', tool shank 50'', toothed segment 20', bushing 24', micrometric screw 30', these last ones 20', 24' and 30' arranged on a common geometric axis, ring 40' and spacer ring 41' that actuate as a bearing for micrometric screw 30' and graduated dial 43' fitted on micrometric screw 30' through thumb screw 44'.

Cylindrical cartridge 10' is provided with two seats 1' and 2' with substantially triangular adjacent sections, positioned at square (right) angle to each other and both inclined in relation to the geometric axis of rotation of cylindrical cartridge 10', according to $\beta'$ and $\beta$ angles shown in FIG. 5.

According to FIG. 6, in seat 2' it is lodged in a sliding way tool shank 50'' which has its cross section in triangular shape having one of its faces provided with teeth 52'' and one of its ends provided with cutting tool 51'.

In seat 1' it is lodged in a sliding way toothed segment 20', which cross section is also of triangular shape, being provided in one of its faces with teeth 22' which couples in a sliding way to teeth 52'' provided with tool shank 50''.

According to FIG. 5, in the interior of toothed segment 20', it is lodged bushing 24' retained by hollow stud 26', being said bushing 24' provided with internal thread 21' where it is coupled threaded end 31' of micrometric screw 30' which other end provided with an enlarged diameter in collar shape 35' with centering diameter 33' and centering projection 34', centering projection 34' being integral with micrometric screw 30' is supported radially and axially by centering rings 40' and 41' which are fastened through screws 45' on inclined face 12' provided at the end of cylindrical cartridge 10' and positioned at square (right) angle to seat 1'.

Bushing 24' is of a barrel shape with its two ends tapered on diameter, which progressively narrows towards both ends, said tapered ends 24a' that mate with corresponding female tapers 20a' and 26a' provided internally in toothed segment 20' and in hollow stud 26' respectively, and it is also provided with slotted sections 24b' longitudinally cut in its body on both sides and inserted between themselves in such a way that the slots starting from one end do not go through the other end.

Backlash suppression between the male thread of micrometric screw 30' and female thread 21' provided in bushing 24', is accomplished by tightening hollow stud 26', which when rotated in an internal thread provided in toothed segment 20' presses bushing 24' between female tapers 20a' and 26a' which when actuate on male tapered section 24a' and in cooperation with slotted sections 24b', they force a contraction imposing an elastic decrease of external diameter of bushing 24' and, consequently, also decreasing the diameter of female thread 21' which involves the thread of micrometric screw 30' until totally eliminating backlash between said threads, however, allowing that micrometric screw 30' can be smoothly turned.

Pin 27' radially fastened to toothed segment 20' and with its free end fitted in one of the slotted sections 24b' provided in bushing 24', prevents that said bushing 24' can be turned in relation to said toothed segment 20'.

The bearing support at the end of micrometric screw 30' is accomplished radially by the fitting without play of centering diameter 33' in bore of ring 41', and axially by retaining without play collar 35' between face 41'' of ring 41' and inclined face 12', the latter provided at the end of cylindrical cartridge 10', being that ring 40' acts as a spacer between said faces 41'' and 12'. Both the fitting of centering diameter 33' in bore of ring 41' and the holding of collar 35' between faces 12' and 41'' are accomplished without any clearance, however, in a way that allows micrometric screw 30' to be smoothly turned through thumb screw 44'.

At centering projection 34' provided at the end of micrometric screw 30' it is centered graduated dial 43', fastened by thumb screw 44' which besides fastening said graduated dial 43', it is also used as a knob to rotate micrometric screw 30'. Once thumb screw 44' is tightened, graduated dial 43' and said thumb screw 44' are solidarily joined to micrometric screw 30'.

Turning micrometric screw 30' clockwise or counterclockwise, actuating manually on thumb screw 44', the threaded end of thread 31' of said micrometric screw 30' which is coupled to internal thread 21' provided in bushing 24' causes a displacement to toothed segment 20' in the direction indicated by arrow X' or in the direction indicated by arrow Y'.

Teeth 52'' provided in tool shank 50'' and 22' provided in toothed segment 20' are engaged between themselves and are cut at a slight inclination $\alpha$ in relation to the longitudinal section of toothed segment 20' in such a way that with the displacement of said toothed segment 20' in the direction indicated by arrows X', Y', the action exerted by inclination $\alpha$ of teeth 52'' and 22' cause a displacement of tool shank 50'' in the direction indicated by arrows Z', W', indirectly withdrawing or approaching the edge of tool 51' from or to the geometric axis of rotation of cylindrical cartridge 10' in the direction indicated by arrows K, L, resulting in an increment or in a decrement which corresponds to an increase or to a decrease in the depth of cut.

The special configuration of the cross section of tool shank 50'' and toothed segment 20', which special profiles of flanks opposite to the face provided with teeth are not parallel between themselves but convergent, the cross section may have a triangular shape as illustrated in FIGS. 6 and 7 or the shape of an involute or the shape where the flanks are of unequal profiles or still any other shape, whenever the distance between the flanks of the cross section, measured parallel to the toothed plane, is decreasing as measurement is made in parallel lines progressively approaching the converging point opposite to the face provided with teeth of the respective toothed segment 20' and of tool shank 50'', and the configuration of teeth with inclined flanks of both indentatins 52'' and 22' may have the shape of a triangular prism or the shape of an involute or the shape where the flanks are of unequal profile or still any other shape in which the tooth thickness decreases as the profile approaches the converging point at the tooth top, making possible that upon toothed segment 20' having been driven through two studs 62', each one pressing a Belleville spring (disc spring) 61' acting on face 23' of said toothed segment 20', all clearances are totally and integrally eliminated between tool shank 50'' and its guide in seat 2', also between toothed segment 20' and its guide in seat 1' and also between the flanks of teeth 52'' and 22', to the extent that the sliding of tool shank 50'', the sliding of toothed segment 20' and sliding of teeth 52'' over teeth 22' occur under a contact of metal to metal condition, without play or clearance of any nature or magnitude, no matter how infinitely small, and without blocking or hampering said sliding motion of tool shank 50'' and of toothed segment 20' which must occur under smooth rotation of micrometric screw 30'.

Once studs 62' are adjusted with proper load on Belleville springs (disc springs) 61', these springs store enough energy to eliminate any clearance or play mentioned above and to actuate as self-adjusting elements in the event there is slight wear that may occur after long use in the sliding surfaces and their respective seats, as well as in the flanks of teeth 52" and 22'. After adjustment, studs 62' are locked by tightening lock stud 60'.

The sliding action without clearance of tool shank 50" and of toothed segment 20' in seats 2' and 1' respectively, the sliding action also totally free from any backlash between flanks of teeth 52" and 22', the rotation of micrometric screw 30' without clearance in internal thread 21 and without axial clearance in the bearing consisting of inclined face 12' (provided in cylindrical cartridge 10') and face 41" of ring 41', said sliding action without clearance guarantees the stability of the position of edge of tool 51, so that radial distance GF—EG, GF'—EG' (FIG. 5) is assured within the micron $\mu m$, said radial distance GF—EG, GF'—EG' measured from the tool edge farthest point to the geometric axis of cylindrical cartridge 10', around which in a 360° revolution of the tool, precision repeatability is assured in a constant way, until the tool wear occurs.

Still looking at FIG. 5, at each fraction of revolution of micrometric screw 30' corresponds a displacement of toothed segment 20' in a direction parallel to the axis of said micrometric screw 30' which is a function of thread pitch of this last one.

On its turn, at each displacement of toothed segment 20' along its geometric axis, corresponds a displacement of tool shank 50", also along its geometric axis which is the function of the inclination angle $\alpha$ of teeth 52" and 22' in relation to the geometric axis of toothed segment 20'.

Still, the displacement of tool shank 50" consists of an axial displacement along the geometric axis of cylindrical cartridge 10' of limited interest, and of a radial displacement which determines the GF'—EG' radius variation and, consequently, the diameter variation obtained with the setting. Such a radial displacement is the function of said displacement of tool shank 50" and angle $\beta$ with which the sliding axis of tool shank 50" makes with the rotating axis of cylindrical cartridge 10' or angle $\beta$, with which the sliding axis of toothed segment 20' makes with the rotating axis of cylindrical cartridge 10'.

Summing up and chronologically analyzing the degree of reading fineness in micrometric devices either for through or blind bores, the conclusion is that said degree of reading fineness of the devices depends essentially on the combination of two effects generated by two motion reduction systems or demultipliers constituting the referred combination of also referred two effects in a third and final effect.

The first effect is the displacement of toothed segment 20, 20' along the axis direction of said micrometric screw 30, 30' obtained from one complete turn on graduated dial 43, 43' and as a consequence on micrometric screw 30, 30' that can be mathematically represented by a quotient QI which is defined as being the ratio between displacement of toothed segment 20, 20' per rotation of micrometric screw 30, 30' (due to its thread) and the number of divisions or lines of graduated dial 43, 43'. It should be pointed out that the displacement of toothed segment 20, 20' imposes simultaneously a certain displacement to tool shank 50, 50', 50" as it will be described and mathematically represented further below right after example "a". As example "a", if toothed segment 20, 20' displaces 0.5 mm at each complete rotation of graduated dial 43, 43' which is a function of the pitch thread of micrometric screw 30, 30', that is 0.5 mm/rot, and said graduated dial 43, 43' has fifty (50) divisions or lines, it will enable a reading of the displacement imposed to toothed segment 20, 20' of 0.01 mm, that is, one hundredth of a millimeter for each division (line) of graduated dial 43, 43', therefore, QI=0.5/50=0.01 mm/line.

The second effect that can be mathematically represented by quotient QII, which is the ratio between the amount of displacement of toothed segment 20, 20' and the amount of radial displacement produced by this displacement on tool shank 50, 50', 50", and consequently on tool tip 51, 51', being said quotient QII a function of angles $\alpha$, $\beta$ and $\beta'$ and defined as being the demultiplying ratio of refinement or improvement of the system.

As another example "b" if the displacement of toothed segment 20, 20' is 0.01 mm for each division (line) of graduated dial 43, 43' and if the radial displacement caused on tool shank 50, 50', 50" is, for instance, 0.0005 mm for each division (line), the demultiplying ratio is represented by the expression 0.01/0.0005=20 or 1:20, that is, to say that the radial displacement of tool tip 51, 51' is so many times smaller than the displacement of toothed segment 20, 20' as is the demultiplying ratio.

Angles $\beta$ and $\beta'$ are determined on a case by case basis by the sub-micron boring tool and pre-setting system design, therefore, for each application where $\beta$ and $\beta'$ are determined, the demultiplying ratio is exclusively the function of angle $\alpha$.

This means that by varying the angle $\alpha$ according to the mathematical ratio that connects it to other parameters, any demultiplying ratio can be obtained, that is, a given amount of displacement of toothed segment 20, 20' causes a radial displacement to tool shank 50, 50', 50" of an amount of greater or lesser magnitude of the amount of displacement of toothed segment 20, 20' in accordance with what might have been established as the value for angle $\alpha$.

The demultiplying ratio has been so called because it represents the refinement of this system due to the demultiplication effect that is, the ratio between the variation that can be obtained in the distance GF—EG, GF'—EG' and the variation of the axial position of toothed segment 20, 20'. It should be remembered that the refinement of the resolution is also due to the demultiplying ratio.

A third and final effect which, in other words, is the proper radial displacement caused on tool shank 50, 50', 50" and on tool tip 51, 51' obtained from the turn of graduated dial 43, 43' and, consequently, of micrometric screw 30, 30', being said third effect an association of effects of the two previously described effects, which can be mathematically represented by a quotient QIII which is the ratio between quotients QI and QII.

As a final example "c" if QI=0.5/50=0.01 mm/line and if QII=0.01/0.0005=20, quotient QIII will be: QI/QII=0.01/20=0.0005 mm/line which is the final resolution of the system.

Considering that the sub-micron system subject of this invention is destined for the finish machining of ultra precision bores, allowing fine tool setting, that is to say allowing a very fine micrometric displacement of tool shank 50, 50', 50" for a certain reading of the graduated dial, both in the version for finishing through bores FIGS. 1, 2, 3, 4, 4a and 4b and in the version for machining blind bores, FIGS. 5, 6 and 7, consequently, the amplitude of the field of machining μ is limited between the smallest and the largest machinable diameters as shown in FIG. 8, because said amplitude of field of machining depends on the maximum permitted travel of tool shank 50, 50', 50" due to angle α of inclination of teeth to a required degree of precision.

Looking at FIGS. 8 and 9, to increase the amplitude of field of machining μ between the minimum and maximum machinable diameters, using a same sub-micron system, it is provided a system for clamping cutting tool 51, 51' where said tool 51, 51' is lodged in support 130 in "L" shape with a certain measure M at its rear side, which enables the machining of bores lying between diameters d and d' which once replaced by another support 131, see FIG. 9, enables the machining of bores lying between diameters d' and d" in the field of machining μ, reutilizing the feed field permitted by tool shank 50, 50', 50" and so on using subsequent longer "L" shape supports.

The difference between measures M and M' being slightly smaller than the maximum travel permitted by tool shank 50, 50' and 50", makes possible the machining of any bore diameter lying between diameters d and d" by only replacing support 130 by support 131.

A plurality of supports in which the difference between M and M' are added to each new support, enables to repeat the enlargement of machining μ field a plurality of times.

Still in time, it is important to notice that the displacements of toothed segment 20' and tool shank 50", as has been evidenced, proceed in a smooth way, are ultra precise, totally exempt from deviations (errors) or backlash, because the mating of flanks of male toothed segment 20' and male tool shank 50" with the corresponding mating flanks of female seats 1' and 2', establishes an adequate condition totally free from backlash and that the GF—EG distance which corresponds to the radius described by the tool edge at its farthest or most distant point from its geometrical axis of rotation which can be chosen and selectively set. In this way, it is concluded to be axiomatically impossible that variation of any magnitude, nature or dimension occurs in the distance that corresponds to the radius described by the tool extreme edge at its farthest or most distant point from its geometric axis for any reason, fact or condition attributable to the sub-micron system as a whole or for any reason, fact or condition attributable to one or more components taken separately.

In other words, once it is admitted that accomplishment of ultra-precision presupposes that a priori certain basic conditions are ensured, such as degree of environment cleanliness; strict temperature controlled ambient and vibration; and admitting also as practically negligible elastic deformation variations of the assembly that comprises the sub-micron system (once elastic deformations may account to mere few millionths of a micron), remember that the reasons, facts or conditions to change the distance GF—EG, GF'—EG' that corresponds to the radius described by the tool farthest point on tool tip from its geometric axis of rotation are three, that is: 1. change and/or alteration in the position of geometric axis; 2. tool wear; and 3. change made by the operator or by a cause external to the sub-micron system by an action on the micrometric dial through knob rotation.

No other condition makes possible to change said GF—EG, GF'—EG' distance within ultra precision standards, since the maximum permitted axial motion to the micrometric screw, added to the maximum permitted backlash between the thread of said screw and the thread of its nut, results in negligible deviation of the tool edge in relation to its rotational geometric axis.

Furthermore, it should be considered that the maximum backlash of 0.002 mm between collar 35, 35' of micrometric screw 30, 30' and rings 40, 40', 41, 41', 42 can be reduced by utilizing the materials elastic property of which said rings 40, 40', 41, 41', 42 are made, which when submitted to compression through the proper tightening of screws 45, said maximum 0.002 mm backlash can be progressively reduced to very minute amounts in the order of 0.0001 mm tending towards zero.

And as explained above, taking into consideration that said maximum permitted 0.002 mm backlash between the screw collar 35, 35' and its axial thrust bearings, that is, rings 40, 40', 42, 42' can be reduced to a small amount in the order of 0.0001 mm (one tenth of the micron) through the already described effect produced by said elastic deformation of rings 40, 40', 41, 41', 42 and that the maximum permitted backlash or play between the thread of micrometric screw 30, 30' and its bushing 24, 24' can also be reduced through backlash suppression by acting on hollow stud 26, which also enables to reduce the backlash or play between threads of micrometric screw 30, 30' and bushing 24, 24' also down to an amount of the order of 0.0001 mm (one tenth of the micron), it follows that the requirement imposed by the definition of ultra-precision class or precision degree, is as it is accepted and understood within the present state-of-the-art. It is also important to point out that said effect produced by the peculiar elastic deformation of materials to which rings 40, 40', 41, 41', 42 can be submitted, has been foreseen, duly considered and theoretically analyzed at the conception (design) stage and then evidenced by laboratory tests and research carried out that positively confirmed the validity of what was foreseen and previously considered.

Although specific constructions of a sub-micron boring tool and pre-setting system is described and illustrated, it should be pointed out that structural changes and/or alternative designs can be made without deviating from the scope of the present invention.

What is claimed as new and desired to be protected by Letters Patent is set forth in the appended claims:

1. An ultra-precision sub-micron boring tool and pre-setting system, comprising
   a cylindrical cartridge having an internal hollow portion,
   a first through bore located in said hollow portion,
   a toothed segment lodged in said first through bore, said toothed segment having an axial bore,
   a micrometric screw passing through said axial bore in said toothed segment, said toothed segment and said micrometric screw being structured and arranged on a common geometric axis,
   a bushing having an internal thread located in the interior of said axial bore, said micrometric screw structured and arranged to engage with said internal thread,
   a hollow stud structured and arranged to lodge and retain said bushing, a set of rings structured and arranged to envelope said micrometric screw, said micrometric screw being supported by said set of rings in relation to said cylindrical cartridge, a locknut, a graduated knob or dial attached to an end of said micrometric screw through said locknut, a second through bore located in said cylindrical cartridge, said second through bore being arranged substantially in a right angle plane which may be inclined in relation to said first through bore, a tool shank lodged in said second through bore, a tool tip located on said tool shank, a backlash suppression system located in said second through bore and between said tool shank and said toothed segment in said first through bore, said backlash suppression system comprising a movement demultiplier mechanism consisting of rack-tape shaped indents arranged in corresponding secant planes on said toothed segment and said tool shank, said indent on said toothed segment being inclined in relation to a geometric axis of said toothed segment such that said indent on said toothed segment is slidably coupled substantially backlash free to said indent on said tool shank.

2. An ultra-precision sub-micron boring tool and pre-setting system as claimed in claim 1, wherein said micrometric screw has a threaded portion at a first end, said threaded portion passing through said axial bore in said toothed segment and meshing with said internal thread in said bushing, said graduated knob or dial comprises a rotation control knob supported close to an opposite, second end of said micrometric screw from said threaded portion, said second end having a threaded external surface, said bushing is retained internally in an extension by said hollow stud, said second through bore is located at a right angle to a longitudinal axis of said cylindrical cartridge, said cylindrical cartridge has a recessed end structured and arranged to connect to an extended shank, said locknut comprising a stud and pad which act to secure said micrometric screw in said cylindrical cartridge, said locknut being threaded to said second end of said micrometric screw, said system further comprising a first ring, a spacer ring, and a second ring, said first and second rings and said spacer ring being lodged in said first through bore of said cylindrical cartridge and being structured and arranged to support said micrometric screw.

3. An ultra-precision sub-micron boring tool and pre-setting system as claimed in claim 2, wherein said first through bore has a stepped portion, the diameter of said stepped portion being larger than the diameter of said first through bore, and said second through bore is located in an intermediate position between opposite ends of said first through bore.

4. An ultra-precision sub-micron boring tool and pre-setting system as claimed in claim 3, wherein a plurality of rings of said set of rings are lodged in said stepped portion of said first through bore, said system further comprising screws passing through said plurality of rings, said screws being fastened in a bottom wall of said stepped portion of said first through bore such that said micrometric screw is held axially by said plurality of rings substantially without any backlash.

5. An ultra-precision sub-micron boring tool and pre-setting system as claimed in claim 4, further comprising a rotatable collar integral to said micrometric screw and arranged in a central opening of said spacer ring, a rotating motion of said collar in relation to said first and second rings causing said micrometric screw to rotate without any axial displacement in relation to said cylindrical cartridge.

6. An ultra-precision sub-micron boring tool and pre-setting system as claimed in claim 5, wherein said micrometric screw has a tapered seat in proximity to said second end, said rotation control knob being concentrically arranged around said tapered seat and axially locked by means of said locknut.

7. An ultra-precision sub-micron boring tool and pre-setting system as claimed in claim 6, wherein said rotation control knob has an indent on a face adjacent to an outer face of said cylindrical cartridge, said system further comprising a locating ring slidably lodged at one end of said cylindrical cartridge closest to said second end of said micrometric screw, a face of said locating ring having an indent, said indent of said rotation control knob having teeth structured and arranged to mesh with said indent in said locating ring, springs structured and arranged to constantly force said locating ring against said indent in said rotation control knob, a protection cover structured and arranged to envelope said locating ring, and a pin structured and arranged to radially retain said locating ring in said rotation control knob.

8. An ultra-precision sub-micron boring tool and pre-setting system as claimed in claim 7, wherein said rotation control knob has an externally and peripherally graduated dial arranged adjacent to said protection cover, a reference for said dial being determined by an index or reference point provided in said protection cover.

9. An ultra-precision sub-micron boring tool and pre-setting system as claimed in claim 8, further comprising reference lines on said rotation control knob, a rotating movement of said rotating control knob between adjacent ones of said lines displacing said toothed segment along said longitudinal axis of said cylindrical cartridge, the displacement of said toothed segment being equal to the ratio between the pitch of said micrometric screw and the number of lines on said rotation control knob.

10. An ultra-precision sub-micron boring tool and pre-setting system as claimed in claim 9, wherein said rotation control knob is structured and arranged such that by turning said rotation control knob, the axial displacement of said toothed segment is regulated.

11. An ultra-precision sub-micron boring tool and pre-setting system as claimed in claim 10, wherein the axial displacement of said toothed segment causes a radial displacement of said tool shank in a perpendicular direction.

12. An ultra-precision sub-micron boring tool and pre-setting system as claimed in claim 1, wherein said backlash suppression system comprises a resilient member lodged in a first hole provided longitudinally in said tool shank, a first stud entering into one side of said first hole, and a second stud having an end entering into an opposite side of said first hole, said resilient member being arranged between said end of said second stud and said first stud, said second stud also being threaded in a second hole provided in said cylindrical cartridge, said tool shank being provided with a third hole, said third hole opening to the interior of said tool shank through an aperture provided in said tool shank, wherein said resilient member forces said tool shank radially inward.

13. An ultra-precision sub-micron boring tool and pre-setting system as claimed in claim 1 or 12, wherein said backlash suppression system comprises an axial bore located in the interior of said tool shank, and an indented plunger lodged in said axial bore in said tool shank, said indented plunger having an indent coplanar to said indent of said tool shank, said indent of said tool shank and said indent of said indented plunger both contacting said indent of said toothed segment.

14. An ultra-precision sub-micron boring tool and pre-setting system as claimed in claim 13, further comprising an adjusting stud threaded in the interior of said tool shank, said adjusting stud structured and arranged to adjust the displacement of said indented plunger in relation to both said toothed segment and said tool shank, which adjustment is made until opposite flanks of said indent of said toothed segment contact opposite flanks of said indented plunger and also with opposite flanks of said indent of said tool shank, the adjustment keeping said tool shank, said indented plunger and said toothed segment totally free from any backlash and enabling said toothed segment to slide smoothly in relation to said tool shank and said indented plunger, and a locking stud threaded against said adjusting stud, said locking stud structured and arranged to lock the adjustment being made by said adjusting stud.

15. An ultra-precision sub-micron boring tool and pre-setting system as claimed in claim 14, wherein said adjusting stud is structured and arranged to move in the interior of said tool shank such that said indented plunger moves in one direction while said tool shank moves simultaneously in an opposite direction.

16. An ultra-precision sub-micron boring tool and presetting system as claimed in claim 15, wherein said indented plunger and said tool shank are structured and arranged such that a relative motion between said indented plunger and said tool shank in opposite directions actuated over said indent of said toothed segment causes said toothed segment to retract moving in an opposite direction to the direction of movement of said indented plunger and said tool shank.

17. An ultra-precision sub-micron boring tool and presetting system as claimed in claim 16, further comprising flanks located on said indent of said toothed segment, said toothed segment is prevented from any angular displacement in relation to said cylindrical cartridge by means of said flanks, a first side of said flanks on said toothed segment contacting said indent of said indented plunger at a first point, and a second side of said flanks on said toothed segment contacting said indent of said tool shank, said second side being opposite to said first side in each of said flanks at a second point, said first and second points being in a common plane.

18. An ultra-precision sub-micron boring tool and presetting system as claimed in claim 17, wherein said backlash suppression is accomplished by separating said toothed segment and said tool shank, said separation being caused by contact of converging special teeth flank profiles on said tool shank, said indented plunger and said toothed segment, said tool shank and said indented plunger contacting said adjusting stud in the interior of said tool shank, said first side of said flanks of said toothed segment contacting flanks on one side of said indent of said tool shank, said second side of said flanks of said toothed segment contacting flanks on one side of said indented of said indented plunger, the thickness of said flank profiles decreasing as said flank profiles approach the converging point at the tooth tip of said flank profiles, said separation being stopped when said toothed segment contacts a wall of said first through bore, when said indented plunger contacts said tool shank and when said tool shank contacts a wall of said second through bore.

19. An ultra-precision sub-micron boring tool and presetting system as claimed in claims 18, wherein said indented plunger is pressed by said adjusting studs such that said indented plunger moves simultaneously and in an opposite direction to said tool shank, said indented plunger, said tool shank and said toothed segment ceasing to move when all sliding surfaces are prevented from proceeding due to metal to metal contact between the respective indents of said tool shank, said toothed segment and said indented plunger, thereby said tool tip does not move unless said graduated control knob or dial is actuated so that at each complete revolution of said tool tip the precision of repetition or variation of distance from the farthest point of cutting of an edge of said tool tip to the geometric axis of said cylindrical cartridge is guaranteed to be within the micron range.

20. An ultra-precision sub-micron boring tool and presetting system as claimed in claim 2, wherein a recessed end of said cylindrical cartridge connects to an extended shank, said recessed end comprising a face of rest arranged perpendicularly to a geometric axis of said cylindrical cartridge, and a threaded portion and centering portion which project externally from said face of rest.

21. An ultra-precision sub-micron boring tool and presetting system as claimed in claim 1, wherein said micrometric screw has a seat incorporated concentrically in an external face, said seat being structured and arranged to provide support for said system on a machine tailstock.

22. An ultra-precision sub-micron boring tool and presetting system as claimed in claim 21, further comprising a balancing system for balancing said system, said balancing system comprising two blocks lodged in a slot provided in said cylindrical cartridge, said blocks being positioned in a parallel secant plane in relation to a geometric axis of said second through bore, said blocks having elongated openings for passing lock screws therethrough.

23. An ultra-precision sub-micron boring tool and presetting system as claimed in claim 22, wherein said micrometric screw has a threaded portion structured and arranged to be coupled to said internal thread in said bushing, said system being arranged for blind bores.

24. An ultra-precision sub-micron boring tool and presetting system as claimed in claim 23, wherein said internally hollow portion of said cylindrical cartridge has seats, said seats having sections with converging opposite flanks arranged adjacent and perpendicular to each other, said seats being inclined in relation to and forming at each seat an angle to a rotation geometric axis of said cylindrical cartridge.

25. An ultra-precision sub-micron boring tool and presetting system as claimed in claim 24, further comprising
 a first seat in which said toothed segment is slidably lodged,
 a side of said toothed segment having teeth comprising converging opposite flanks,
 a second seat in which said tool shank is lodged,
 a face of said tool shank having teeth comprising converging opposite flanks,
 a cutting tool tip provided at an end of said tool shank,
 said teeth of said toothed segment slidably connecting to said teeth of said tool shank.

26. An ultra-precision sub-micron boring tool and presetting system as claimed in claim 25, wherein said first and said second seats have sections suitable for adjustment to said teeth of said toothed segment and said tool shank, respectively, said first and second seats having female flanks and said toothed segment and said tool shank having corresponding male flanks,
 said female flanks of said first and second seats contacting said male flanks of said toothed segment and said tool shank such that an adjustable position of said micrometric screw is established free from backlash and interference.

27. An ultra-precision sub-micron boring tool and presetting system as claimed in claim 26, wherein said cylindrical cartridge has an inclined face in proximity to said threaded end of said micrometric screw, said inclined face being positioned substantially at a right angle to said first seat, said system further comprising
 a collar located at said threaded end of said micrometric screw,
 a centering diameter connected to said collar,
 a centering projection,
 said collar, centering diameter and centering projection being radially and axially supported by a plurality of rings of said set of rings on said inclined face of said cylindrical cartridge, and
 screws arranged to fasten said plurality of rings on said inclined face.

28. An ultra-precision sub-micron boring tool and presetting system as claimed in claim 27, wherein said locknut comprises a thumb screw, said system further comprising,
 a first one of said plurality of rings having a bore, said centering diameter being radially retained in said bore and axially retained by said collar between a face of said first ring and said inclined face of said cylindrical cartridge, and
 a second one of said plurality of rings actuating as a spacer ring between said face of said first ring and said inclined face of said cylindrical cartridge, such that said micrometric screw is supported and manually turnable through said locknut by tightening said locknut which also fastens said graduated knob or dial.

29. An ultra-precision sub-micron boring tool and presetting system as claimed in claim 28, wherein said graduated dial is structured and arranged such that by turning said graduated dial, the axial displacement of said toothed segment is regulated.

30. An ultra-precision sub-micron boring tool and presetting system as claimed in claim 29, wherein a displacement of said toothed segment causes a corresponding displacement of said tool shank in a perpendicular direction such that said tool tip moves in an inclined plane toward and away from a geometric axis of rotation of said cylindrical cartridge.

31. An ultra-precision sub-micron boring tool and presetting system as claimed in claim 30, wherein
 said first seat has a first guide for said toothed segment,
 said second seat has a second guide for said tool shank, and
 said backlash elimination system comprises
 adjusting studs structured and arranged to press disc springs over a face of said toothed segment such that backlash is eliminated between said toothed segment and said first guide, between said tool shank and said second guide and between flanks of said indents of said tool shank and said toothed segment, and
 lock studs to secure said adjusting studs in a fitting condition.

32. An ultra-precision sub-micron boring tool and presetting system as claimed in claim 31, wherein said toothed segment is continuously pushed against said first guide in said first seat under the action of energy stored in said disc springs, said disc springs and the geometric shape of said first guide causing a force to be generated that pushes said toothed segment against said tool shank, whereby said disc springs presses teeth of said indent of said toothed segment to mesh with teeth of said indent of said tool shank such that backlash between said indent of said tool shank and said indent of said toothed segment is eliminated,
 the shape of said indent of said toothed segment and said indent of said tool shank causing a force to be generated to push said tool shank against said second guide such that backlash is eliminated between said tool shank and said second guide, and
 said micrometric screw rotating smoothly by means of a smooth manual operation of said graduated knob or dial and said locknut.

33. An ultra-precision sub-micron boring tool and presetting system as claimed in claim 1, wherein said tool tip is clamped and lodged in replaceable L-shaped supports, each of said L-shaped support having a measure at a rear side such that said tool tip extends over an edge of said tool shank, varying heights of said measure enabling the machining of holes at varying depths such that by replacing said L-shaped support, the machining field can be enlarged a number of times.

34. An ultra-precision sub-micron boring tool and presetting system as claimed in claim 1, 12 or 25, wherein said backlash elimination system comprises said indent of said tool shank and said indent of said toothed segment and/or said indent of said indented plunger, said indents having converging special teeth flank profiles, the thickness of the teeth in said teeth flank profiles decreasing as said teeth flank profiles approach the converging point of the top of the teeth.

35. An ultra-precision sub-micron boring tool and presetting system as claimed in claim 1 or 23, wherein said micrometric screw, said collar of said micrometric screw and said set of rings are structured and arranged such that by tightening said screws through said set of rings, the resulting adjustment from the elastic deformation of said set of rings absorbs the residual axial micro backlash on said collar and reduces the micro backlash to an amount in millimeters within the range of a tenth of a micron or smaller and has a tendency to achieve a micro backlash of zero.

36. An ultra-precision sub-micron boring tool and presetting system as claimed in claim 1, 12 or 25, wherein the ratio between the displacement of said toothed segment per rotation of said micrometric screw is determined by the pitch of the thread of said micrometric screw and the number of graduations on said graduated knob or dial and is expressed by quotient QI.

37. An ultra-precision sub-micron boring tool and presetting system as claimed in claim 36, wherein the ratio between the displacement of said toothed segment and the radial displacement of said tool shank and said tool tip in relation to the geometric axis of said cylindrical cartridge is determined by the angle of inclination of said indents of said toothed segment and said tool shank, the ratio being termed the demultiplying ratio and being expressed by the quotient QII, said ratio also being affected by the inclination of said tool shank relative to the geometric axis of the boring tool for blind holes.

38. An ultra-precision sub-micron boring tool and presetting system as claimed in claim 37, wherein the ratio between quotient QI and quotient QII determines quotient QIII, quotient QIII expressing the radial effect on said tool tip resulting from the amount of rotation of said graduated knob or dial corresponding to the displacement between adjacent lines on said graduated knob or dial which promotes variation of the distance between said tool tip and the geometric axis of said cylindrical cartridge.

* * * * *